United States Patent [19]

Sako et al.

[11] Patent Number: 4,497,058
[45] Date of Patent: Jan. 29, 1985

[54] METHOD OF ERROR CORRECTION

[75] Inventors: Yoichiro Sako; Kentaro Odaka, both of Tokyo, Japan

[73] Assignee: Sony Corporation, Tokyo, Japan

[21] Appl. No.: 579,003

[22] Filed: Feb. 15, 1984

Related U.S. Application Data

[63] Continuation of Ser. No. 274,262, Jun. 16, 1981, abandoned.

[30] Foreign Application Priority Data

Jun. 20, 1980 [JP] Japan .................... 55-84425

[51] Int. Cl.$^3$ .................................... G06F 11/10
[52] U.S. Cl. ................................ 371/39; 371/37
[58] Field of Search .................. 371/39, 40, 37, 38

[56] References Cited

U.S. PATENT DOCUMENTS

| | | | |
|---|---|---|---|
| 3,638,182 | 1/1972 | Burton et al. | 371/39 |
| 3,958,220 | 5/1976 | Marshall | 371/39 |
| 4,206,440 | 6/1980 | Doi et al. | 371/39 |
| 4,238,852 | 12/1980 | Iga et al. | 371/38 |
| 4,306,305 | 12/1981 | Doi et al. | 371/38 |
| 4,330,860 | 5/1982 | Wada et al. | 371/39 |
| 4,336,612 | 6/1982 | Inoue et al. | 371/39 |

*Primary Examiner*—Jerry Smith
*Assistant Examiner*—Michael R. Fleming
*Attorney, Agent, or Firm*—Lewis H. Eslinger; Alvin Sinderbrand

[57] ABSTRACT

A method of receiving and decoding doubly-encoded, interleaved data occurring in blocks of information words and first and second check words to correct errors occurring due to transmission, includes adding error pointers to indicate uncorrectable errors, and thereafter checking the number of pointers in each block and protecting against miscorrection of errors. The data are decoded in a first decoder and the information words and first check words are corrected by syndromes using the second check words. A pointer is added to any words containing uncorrectable error. Then the words so decoded are deinterleaved and decoded in a second decoder, where the information words are corrected by syndromes using the first check words. Here the pointers show the position of any erroneous words to facilitate error correction. The number of erroneous words in each block, at the second decoder, is determined by counting the associated pointers. If the number is less than a predetermined value, the pointers are cleared, but if it is greater than that value, the data are regarded as unreliable, and the pointers remain. Alternatively, all words in the block are given error pointers. Also, for a given number of erroneous words in each block as determined by syndromes, if the number of pointers is less than a predetermined amount, the entire block is regarded as unreliable and all words are given a pointer. Finally, uncorrected erroneous words are compensated by interpolation.

12 Claims, 10 Drawing Figures

|16 BITS| FIG. 2

| SYNC | $u_1$ | $u_2$ | $u_3$ | $u_4$ | $u_5$ | $u_6$ | $u_7$ | $u_8$ | ---- | $u_{27}$ | $u_{28}$ | $u_{29}$ | $u_{30}$ | $u_{31}$ | $u_{32}$ |

|←——— 1 BLOCK       $=(8 \times 32 + 16 = 272$ BITS$)$ ———→|

FIG. 5

$$H_{C2} \cdot V^T = \begin{pmatrix} S_{20} \\ S_{21} \\ S_{22} \\ S_{23} \end{pmatrix}$$

$$= \begin{bmatrix} 1 & 1 & 1 & 1 & 1 & 1 & --- & 1 & 1 & 1 & 1 & 1 \\ \alpha^{27} & \alpha^{26} & \alpha^{25} & \alpha^{24} & \alpha^{23} & \alpha^{22} & --- & \alpha^4 & \alpha^3 & \alpha^2 & \alpha^1 & 1 \\ \alpha^{54} & \alpha^{52} & \alpha^{50} & \alpha^{48} & \alpha^{46} & \alpha^{44} & --- & \alpha^8 & \alpha^6 & \alpha^4 & \alpha^2 & 1 \\ \alpha^{81} & \alpha^{78} & \alpha^{75} & \alpha^{72} & \alpha^{69} & \alpha^{66} & --- & \alpha^{12} & \alpha^9 & \alpha^6 & \alpha^3 & 1 \end{bmatrix} \begin{bmatrix} W_{12n-12, A} \\ W_{12n-12, B} \\ W_{12n+1-12, A} \\ W_{12n+1-12, B} \\ W_{12n+4-12, A} \\ W_{12n+4-12, B} \\ W_{12n+5-12, A} \\ W_{12n+5-12, B} \\ W_{12n+8-12, A} \\ W_{12n+8-12, B} \\ W_{12n+9-12, A} \\ W_{12n+9-12, B} \\ W_{12n+2, A} \\ W_{12n+2, B} \\ W_{12n+3, A} \\ W_{12n+3, B} \\ W_{12n+6, A} \\ W_{12n+6, B} \\ W_{12n+7, A} \\ W_{12n+7, B} \\ W_{12n+10, A} \\ W_{12n+10, B} \\ W_{12n+11, A} \\ W_{12n+11, B} \\ Q_{12n} \\ Q_{12n+1} \\ Q_{12n+2} \\ Q_{12n+3} \end{bmatrix}$$

$$H_{c1} \cdot V^T = \begin{Bmatrix} S_{10} \\ S_{11} \\ S_{12} \\ S_{13} \end{Bmatrix}$$

FIG. 4

$$= \begin{Bmatrix} 1 & 1 & 1 & 1 & 1 & \cdots & 1 & 1 & 1 & 1 & 1 \\ \alpha^{31} & \alpha^{30} & \alpha^{29} & \alpha^{28} & \alpha^{27} & \cdots & \alpha^{4} & \alpha^{3} & \alpha^{2} & \alpha^{1} & 1 \\ \alpha^{62} & \alpha^{60} & \alpha^{58} & \alpha^{56} & \alpha^{54} & \cdots & \alpha^{8} & \alpha^{6} & \alpha^{4} & \alpha^{2} & 1 \\ \alpha^{93} & \alpha^{90} & \alpha^{87} & \alpha^{84} & \alpha^{81} & \cdots & \alpha^{12} & \alpha^{9} & \alpha^{6} & \alpha^{3} & 1 \end{Bmatrix} \begin{Bmatrix} W_{12n-12,A} \\ W_{12n-12(1D+1),B} \\ W_{12n+1-12(2D+1),A} \\ W_{12n+1-12(3D+1),B} \\ W_{12n+4-12(4D+1),A} \\ W_{12n+4-12(5D+1),B} \\ W_{12n+5-12(6D+1),A} \\ W_{12n+5-12(7D+1),B} \\ W_{12n+8-12(8D+1),A} \\ W_{12n+8-12(9D+1),B} \\ W_{12n+9-12(10D+1),A} \\ W_{12n+9-12(11D+1),B} \\ Q_{12n-12(12D)} \\ Q_{12n+1-12(13D)} \\ Q_{12n+2-12(14D)} \\ Q_{12n+3-12(15D)} \\ W_{12n+2-12(16D),A} \\ W_{12n+2-12(17D),B} \\ W_{12n+3-12(18D),A} \\ W_{12n+3-12(19D),B} \\ W_{12n+6-12(20D),A} \\ W_{12n+6-12(21D),B} \\ W_{12n+7-12(22D),A} \\ W_{12n+7-12(23D),B} \\ W_{12n+10-12(24D),A} \\ W_{12n+10-12(25D),B} \\ W_{12n+11-12(26D),A} \\ W_{12n+11-12(27D),B} \\ P_{12n} \\ P_{12n+1} \\ P_{12n+2} \\ P_{12n+3} \end{Bmatrix}$$

METHOD OF ERROR CORRECTION

This is a continuation of application Ser. No. 274,262 filed 6/16/81, abandoned.

BACKGROUND OF THE INVENTION

1. Field of the Invention

The present invention relates generally to a method of error correction, and in particular is directed to a method of error correction which is high in error-correcting ability for both burst errors and random errors and can reduce the possibility that an uncorrected error is overlooked.

2. Description of the Prior Art

There has been previously proposed, for example, in copending application Ser. No. 218,256, filed Dec. 19, 1980 and having a common assignee herewith, a data transmission system effective for correcting burst errors using a so-called cross-interleave technique. In such cross-interleave technique, words in a PCM (pulse code modulated) data signal series are provided in plural sequences on plural respective channels arranged in a first arrangement state, and are furnished to a first error-correcting coder to generate therefrom a first check word series. This first check word series and the PCM data signal series in the plural channels are converted to a second arrangement state. Then, one word in the second arrangement state for each of the PCM data signal sequences in the plural channels is furnished to a second error correcting coder to generate therefrom a second check word series, so that a double interleave (i.e., double rearrangement) is carried out for each word. The purpose of the double interleave is to reduce the number of erroneous words in any group of words contained in a common error-correcting block when the check word contained in such error-correcting block and the PCM data associated therewith are dispersed and transmitted. Any such erroneous words are dispersed among several blocks, and are returned to the original arrangement thereof at the receiving side. In other words, when a burst error develops during transmission, the burst error can be dispersed. If the above interleave is performed twice, the first and second check words each are used to correct words in distinct error correcting blocks. Thus, even if an error cannot be corrected by one of the first and second check words, the error can be corrected by the other check word. Therefore, this technique provides a significant advance in error correcting ability for burst errors.

However, when even one bit in one word is discovered to be in error, the entire word is considered erroneous. Therefore, when a received data signal has a relatively large number of random errors, the abovedescribed double interleave technique is not always sufficiently powerful for correcting these random errors.

To this end, it is proposed that an error correcting code high in error correcting ability, for example, Reed-Solomon (RS) Code, Bose-Chaudhuri-Hocquenghem (BCH)code, or a variant of a b-adjacent code, which can correct K word errors, for example, two word errors in one block, and can also correct M word errors, for example, three word errors or four word errors, if the location of errors is known, is combined with the above multi-interleave technique.

This error correcting code enables the simplification of the construction of a decoder when only one word error is to be corrected.

In the case where a first step of decoding is achieved for the second error correcting block, then it is converted to the first arrangement state, and a subsequent step of decoding is carried out for the first error correcting block, it is possible that even if an error exists at the subsequent decoding, it is judged as no error, or the error is not detected. Therefore, in the case of, for example, audio PCM signals, if data occurs with undetected error and the erroneous data are D-A converted without being corrected, an allophone occurs in the audio analog output.

OBJECTS AND SUMMARY OF THE INVENTION

Accordingly, it is an object of this invention to provide an improved method of error correction which can reduce overlooking of errors.

Another object of the invention is to provide a method of error correction by which allophones are prevented from developing when an audio PCM signal is transmitted.

In accordance with the present invention, a method of decoding transmitted digital information signals to correct errors occurring therein as a result of transmission, wherein the information signals are received as blocks of interleaved digital data word signals and are applied to a first decoder as first error-correcting blocks comprised of a plurality of information word signals, a series of first check word signals associated with the plurality of the information word signals, and a series of second check word signals associated with the plurality of information word signals, the information word signals, the first check word signals, and the second check word signals being interleaved, comprising the steps of decoding the received digital data word signals in the first decoder and correcting the decoded digital information word signals and the first check word signals by generating error syndromes using the second check word signals, the corrected and decoded digital information word signals forming a block of interleaved word signals; tagging a pointer code signal to each of the information word signals of the block of interleaved word signals to represent whether an uncorrected error remains in such word signals; delaying the word signals of each such block of tagged interleaved word signals in a deinterleaving stage by respective different amounts so as to deinterleave such tagged interleaved word signals into a different arranging order, thereby providing a second error-correcting block; decoding the digital information word signals of each such second error-correcting block in a second decoder by generating error syndromes using the first check word signals, while, if at least one such word signal is determined to be erroneous, correcting the erroneous word signal by the syndromes and the first check word signals, and then comparing, for each second error-correcting block in which at least one word signal is determined to be erroneous, the number of erroneous word signals as indicated by the pointer code signals with a predetermined value and, when the number is less than the predetermined value, clearing the pointer code signals associated with the corrected erroneous word signals, but, if such number exceeds such value, leaving such pointer code signals unclear; and thereafter compensating any uncorrected erroneous word signals as determined by such pointer code signals.

Other objects, features, and advantages of this invention will be apparent from the following description, taken in conjunction with the accompanying drawings.

BRIEF DESCRIPTION OF THE DRAWINGS

FIG. 1 (formed of FIGS. 1A and 1B together) is a block diagram showing an example of an error correcting encoder to which the present invention is applied;

FIG. 3 (formed of FIGS. 3A and 3B together) is a block diagram showing an example of an error correcting decoder to which the present invention is applied; and FIGS. 4, 5, 6, 7A and 7B are diagrams used to explain the operation of the error correcting decoder.

DESCRIPTION OF THE PREFERRED EMBODIMENTS

First, an error correcting code used in this invention will be explained. In this discussion, the error correcting code is expressed by a vector representation or a cyclic group representation.

To begin, an irreducible mth order polynominal $F(x)$ will be considered on a galois field $GF(2)$. On the field $GF(2)$ which contains only the elements "0" and "1", the irreducible polynominal $F(x)$ has no real root. Thus, an imaginary (or complex) root $\alpha$, which will satisfy $F(x)=0$, will be considered. At this time $2^m$ different elements $0, \alpha, \alpha^2, \alpha^3, \ldots \alpha^{2^m-1}$, each being a power of $\alpha$ and containing a zero element, form an extension galois field $GF(2^m)$. This extension field $GF(2^m)$ is a polynominal ring with an mth order irreducible polynominal $F(x)$, over the field $GF(2)$ as a modulo. The element of $GF(2^m)$ can be expressed as a linear combination of $1, \alpha=[x], \alpha^2=[x^2], \ldots a^{m-1}=[x^{m-1}]$. That is, these elements can be expressed $$a_0 + a_1[x] + a_2[x^2] + \ldots + a_{m-1}[x^{m-1}] = a_0 + a_1\alpha + a_2\alpha^2 + \ldots a_{m-1}\alpha^{m-1}$$

or $$(a_{m-1}, a_{m-2}, \ldots a_2, a_1, a_0)$$

where $a_0, a_1, \ldots a_{m-1}$ belong to $GF(2)$.

As an example, consider the extension field $GF(2^8)$ and, as a modulo, the polynominal $F(x)=x^8+x^4+x^3+x^2+1$, (all variables being eight-bit data). This field $GF(2^8)$ can be expressed as follows:

$$a_7x^7 + a_6x^6 + a_5x^5 + a_4x^4 + a_3x^3 + a_2x^2 + a_1x + a_0$$

or $$(a_7, a_6, a_5, a_4, a_3, a_2, a_1, a_0)$$

Therefore, by way of example, $a_7$ is considered the MSB (most significant bit) and $a_0$ is considered the LSB (least significant bit). Since $a_n$ belongs to $GF(2)$, its elements are either 0 or 1.

Further, from the polynominal $F(x)$ there is derived the following matrix T of m rows by m columns.

$$T + \begin{bmatrix} 0 & 0 & \ldots & 0 & a_0 \\ 1 & 0 & \ldots & 0 & a_1 \\ 0 & 1 & \ldots & 0 & a_2 \\ \vdots & & & & \vdots \\ 0 & 0 & \ldots & 1 & a_{m-1} \end{bmatrix}$$

As an alternative expression, there can be used an expression which includes a cyclic group which recognizes that the remainder of the extension galois field $GF(2^m)$ (except the zero element) forms a multiplicative group with the order $2^m-1$. If the elements of $GF(2^m)$ are expressed by using a cyclic group, the following are obtained:

$$0, 1(=\alpha^{2^m-1}), \alpha, \alpha^2, \alpha^3, \ldots \alpha^{2^m-2}.$$

In the present invention, when m bits form one word and n words form one block, k check words are generated based upon a parity check matrix H, such as the following:

$$H = \begin{bmatrix} 1 & 1 & 1 & 1 \\ \alpha^{n-1} & \alpha^{n-2} & \ldots \alpha & 1 \\ \alpha^{2(n-1)} & \alpha^{2(n-2)} & \ldots \alpha^2 & 1 \\ \vdots & & & \vdots \\ \alpha^{(k-1)(n-1)} & \alpha^{(k-1)(n-2)} & \alpha^{k-1} & 1 \end{bmatrix}$$

Further, the parity check matrix H can be similarly expressed by using the matrix T as follows:

$$H = \begin{bmatrix} I & I & \ldots I & I \\ T^{n-1} & T^{n-2} & \ldots T^1 & I \\ T^{2(n-1)} & T^{2(n-2)} & T^2 & I \\ \vdots & & & \vdots \\ T^{(k-1)(n-1)} & T^{(k-1)(n-2)} & T^{k-1} & I \end{bmatrix}$$

where I is a unit matrix of m rows and m columns.

As mentioned above, the expressions using the root $\alpha$ are fundamentally the same as those using a generating matrix T.

Further, if the case where 4 (k=4) check words are employed is exemplified, the parity check matrix H becomes as follows:

$$H = \begin{bmatrix} 1 & 1 & \ldots 1 & 1 \\ \alpha^{n-1} & \alpha^{n-2} & \ldots \alpha & 1 \\ \alpha^{2(n-1)} & \alpha^{2(n-2)} & \ldots \alpha^2 & 1 \\ \alpha^{3(n-1)} & \alpha^{3(n-2)} & \ldots \alpha^3 & 1 \end{bmatrix}$$

In this case, if a single block of received data is expressed as a column vector $v=(\hat{W}_{n-1}, \hat{W}_{n-2}, \ldots \hat{W}_1, \hat{W}_0)$ where $\hat{W}_i=W_i+e_i$, and $e_i$ is an error pattern, four syndromes $S_0, S_1, S_2$ and $S_3$ generated in the receiving side are expressed as follows:

$$\begin{bmatrix} S_0 \\ S_1 \\ S_2 \\ S_3 \end{bmatrix} = H \cdot V^T$$

This error correcting code can correct errors up to two word errors in one error correcting block and also correct three word errors or four word errors if the error location is known.

In each block there are contained four check words ($p = W_3$, $q = W_2$, $r = W_1$, $s = W_0$). These check words can be obtained from the following relationships:

$$p + q + r + s = \Sigma W_i = a$$

$$\alpha^3 p + \alpha^2 q + \alpha r + s = \Sigma \alpha^i W_i = b$$

$$\alpha^6 p + \alpha^4 q + \alpha^2 r + s = \Sigma \alpha^{2i} W_i = c$$

$$\alpha^9 p + \alpha^6 q + \alpha^3 r + s = \Sigma \alpha^{3i} W_i = d$$

where $$\Sigma \text{ is } \sum_{i=4}^{n-1}.$$

When the process of the calculation will be omitted, the calculation result is as follows:

$$\begin{bmatrix} p \\ q \\ r \\ s \end{bmatrix} = \begin{bmatrix} \alpha^{212} & \alpha^{153} & \alpha^{152} & \alpha^{209} \\ \alpha^{156} & \alpha^{2} & \alpha^{135} & \alpha^{152} \\ \alpha^{158} & \alpha^{138} & \alpha^{2} & \alpha^{153} \\ \alpha^{218} & \alpha^{158} & \alpha^{156} & \alpha^{212} \end{bmatrix} \begin{bmatrix} a \\ b \\ c \\ d \end{bmatrix}$$

The coder provided in the transmission side is to form the check words p, q, r and s by the above manner.

Next, the fundamental algorithm of the error correction will be described when data including the check words generated as above are transmitted and then received.

[1] If there is no error, the syndromes are all zero: $S_0 = S_1 = S_2 = S_3 = 0$

[2] If there is one word error (an error pattern being represented as ei), $S_0 = ei$, $S_1 = \alpha^i ei$, $S_2 = \alpha^{2i} ei$, $S_3 = \alpha^{3i} ei$.

Thus, the following relations are established:

$$\alpha^i S_0 = S_1$$

$$\alpha^i S_1 = S_2$$

$$\alpha^i S_2 = S_3$$

On word error or not can be judged by whether the above relation is established or not when i is successively changed. On the following relation is established.

$$\frac{S_1}{S_0} = \frac{S_2}{S_1} = \frac{S_3}{S_2} = \alpha^i$$

Thus, the pattern of $\alpha^i$ is compared with that previously memorized in a ROM (read only memory) to know the error location i. At this time the syndrome $S_1$ becomes the error pattern ei itself.

[3] In the case of two word errors (ei and ej), the syndromes follow the relationships:

$$S_0 = ei + ej$$

$$S_1 = \alpha^i ei + \alpha^j ej$$

$$S_2 = \alpha^{2i} ei + \alpha^{2j} ej$$

$$S_3 = \alpha^{3i} ei + \alpha^{3j} ej$$

The above equations can be modified as follows:

$$\alpha^j S_0 + S_1 = (\alpha^i + \alpha^j) ei$$

$$\alpha^j S_1 + S_2 = \alpha^i (\alpha^i + \alpha^j) ei$$

$$\alpha^j S_2 + S_3 = \alpha^{2i} (\alpha^i + \alpha^j) ei.$$

Accordingly, if the following equations are established, two word errors are discriminated.

$$\alpha^i (\alpha^j S_0 + S_1) = \alpha^j S_1 + S_2$$

$$\alpha^i (\alpha^j S_1 + S_2) = \alpha^j S_2 + S_3$$

If the above equations are established, it is judged as two word errors. Thus, the error patterns at this time are expressed as follows:

$$ei = \frac{S_0 + \alpha^{-j} S_1}{1 + \alpha^{i-j}} \text{ and } ej = \frac{S_0 + \alpha^{-i} S_1}{1 + \alpha^{j-i}}$$

[4] Where three word errors (ei, ej and ek) occur, the syndromes can be expressed:

$$S_0 = ei + ej + ek$$

$$S_1 = \alpha^i ei + \alpha^j ej + \alpha^k ek$$

$$S_2 = \alpha^{2i} ei + \alpha^{2j} ej + \alpha^{2k} ek$$

$$S_3 = \alpha^{3i} ek + \alpha^{3j} ej + \alpha^{3k} ek$$

The above equations can be modified as follows:

$$\alpha^k S_0 + S_1 = (\alpha^i + \alpha^k) ei + (\alpha^j + \alpha^k) ej$$

$$\alpha^k S_1 + S_2 = \alpha^i (\alpha^i + \alpha^k) ei + \alpha^j (\alpha^j + \alpha^k) ej$$

$$\alpha^k S_2 + S_3 = \alpha^{2i} (\alpha^i + \alpha^k) ei + \alpha^{2j} (\alpha^j + \alpha^k) ej$$

Accordingly, the following equations are derived:

$$\alpha^j (\alpha^k S_0 + S_1) + (\alpha^k S_1 + S_2) = (\alpha^i + \alpha^j)(\alpha^i + \alpha^k) ei$$

$$\alpha^j (\alpha^k S_1 + S_2) + (\alpha^k S_2 + S_3) = \alpha^i (\alpha^i + \alpha^j)(\alpha^i + \alpha^k) ei$$

Accordingly, if the following equation is established, which is a necessary condition for three word errors, then all three word errors can be discriminated.

$$\alpha^i \{\alpha^j (\alpha^k S_0 + S_1) + (\alpha^k S_1 + S_2)\} = \alpha^j (\alpha^k S_1 + S_2) + (\alpha^k S_2 + S_3)$$

The respective error patterns at this time are expressed as follows:

$$ei = \frac{S_0 + (\alpha^{-j} + \alpha^{-k}) S_1 + \alpha^{-j-k} S_2}{(1 + \alpha^{i-j})(1 + \alpha^{i-k})}$$

$$ej = \frac{S_0 + (\alpha^{-k} + \alpha^{-i})S_1 + \alpha^{-k-i}S_2}{(1 + \alpha^{j-i})(1 + \alpha^{j-k})}, \text{ and}$$

$$ek = \frac{S_0 + (\alpha^{-i} + \alpha^{-j})S_1 + \alpha^{-i-j}S_2}{(1 + \alpha^{k-i})(1 + \alpha^{k-j})}.$$

In fact, the construction of a circuit for correcting three word errors is rather complicated and the time required for the correcting operation is long. Therefore, in practice, an error correcting operation is used in which the above operation is combined with an error correcting operation in which the error locations of i, j, k and l are known by an error indication bit, or pointer and the above equations are employed for checking.

[5] Where there are four word errors (ei, ej, ek and el), the syndromes are expressed as follows:

$$S_0 = ei + ej + ek + el$$

$$S_1 = \alpha^i ei + \alpha^j ej + \alpha^k ek + \alpha^l el$$

$$S_2 = \alpha^{2i} ei + \alpha^{2j} ej + \alpha^{2k} ek + \alpha^{2l} el$$

$$S_3 = \alpha^{3i} ei + \alpha^{3j} ej + \alpha^{3k} ek + \alpha^{3l} el$$

The above equations are modified as follows:

$$ei = \frac{S_0 + (\alpha^{-j} + \alpha^{-k} + \alpha^{-l})S_1 + (\alpha^{-j-k} + \alpha^{-k-l} + \alpha^{-l-j})S_2 + \alpha^{-j-k-l}S_3}{(1 + \alpha^{i-j})(1 + \alpha^{i-k})(1 + \alpha^{i-l})}$$

$$ej = \frac{S_0 + (\alpha^{-k} + \alpha^{-l} + \alpha^{-i})S_1 + (\alpha^{-k-l} + \alpha^{-l-i} + \alpha^{-j-k})S_2 + \alpha^{-k-l-i}S_3}{(1 + \alpha^{j-i})(1 + \alpha^{j-k})(1 + \alpha^{j-l})}$$

$$ek = \frac{S_0 + (\alpha^{-l} + \alpha^{-i} + \alpha^{-j})S_1 + (\alpha^{-l-i} + \alpha^{-i-j} + \alpha^{-j-l})S_2 + \alpha^{-l-i-j}S_3}{(1 + \alpha^{k-i})(1 + \alpha^{k-j})(1 + \alpha^{k-l})}$$

$$el = \frac{S_0 + (\alpha^{-i} + \alpha^{-j} + \alpha^{-k})S_1 + (\alpha^{-i-j} + \alpha^{-j-k} + \alpha^{-k-i})S_2 + \alpha^{-i-j-k}S_3}{(1 + \alpha^{l-i})(1 + \alpha^{l-j})(1 + \alpha^{l-k})}$$

Thus, when the error locations (i, j, k, l) are indicated by pointers, the error can be corrected by the above calculation.

The fundamental algorithm of the above error correction is that at the first step it is checked by the syndromes $S_0$ to $S_3$ whether there is an error or not, at the second step it is checked whether the error is one word error or not, and at the third step it is checked whether the error is two word errors or not. When up to two word errors are corrected, the time to complete all the steps becomes long, which poses a problem especially when the error location of two word errors is obtained.

Now, description will be given on a modified algorithm which is effective when the correction of two word errors are assumed without causing the above problem.

The equations of the syndromes $S_0$, $S_1$, $S_2$ and $S_3$ in the case of two word errors (ei, ej) are as follows:

$$S_0 = ei + ej$$

$$S_1 = \alpha^i ei + \alpha^j ej$$

$$S_2 = \alpha^{2i} ei + \alpha^{2j} ej$$

$$S_3 = \alpha^{3i} ei + \alpha^{ej} ej$$

The above equations are modified as follows:

$$(\alpha^i S_0 + S_1)(\alpha^i S_2 + S_3) = (\alpha^i S_1 + S_2)^2$$

The equation is further modified and the following error location polynominal is obtained:

$$(S_0 S_2 + S_1^2)\alpha^{2i} + (S_1 S_2 + S_0 S_3)\alpha^i + (S_1 S_3 + S_2^2) = 0$$

Now, the constants of the respective terms of the above polynominal are assumed as follows:

$$S_0 S_2 + S_1^2 = A$$

$$S_1 S_2 + S_0 S_3 = B$$

$$S_1 S_3 + S_2^2 = C$$

By using the above constants A, B and C, the error location of two word errors can be obtained.

[1] In the case of no error:

$$A = B = C = 0, S_0 = 0 \text{ and } S_3 = 0$$

[2] In the case of one word error: If $A = B = C = 0$, $S_0 \neq 0$ and $S_3 \neq 0$ are satisfied, the error is judged as one word error. From the relation $\alpha^i = (S_1/S_0)$, the error location i can be easily determined. Thus, the error is corrected by using the relation $ei = S_0$.

[3] In the case of two word errors:
If an error occurs more than two words, $A \neq 0$, $B \neq 0$ and $C \neq 0$ are established and hence the judgement thereof becomes quite simple.

At this time, the following equation is established.

$$A\alpha^{2i} + B\alpha^i + C = 0$$

where $i = 0$ to $(n-1)$.

Now, if it is assumed that $(B/A) = D$ and $(C/A) = E$, the following equations are respectively obtained.

$$D = \alpha^i + \alpha^j$$

$$E = \alpha^i \cdot \alpha^j$$

Hence, the following equation is derived, $$\alpha^{2i} + D\alpha^i + E = 0$$

If the difference between two error locations is taken as t, i.e., $j = i + t$, the following equations are obtained.

$$D = \alpha^i(1 + \alpha^t)$$

$$E = \alpha^{2i+t}$$

Accordingly, the following equation is derived:

$$\frac{D^2}{E} = \frac{(1+\alpha^t)^2}{\alpha^t} = \alpha^{-t} + \alpha^t.$$

If the value of $\alpha^{-t}+\alpha^t$ of each value of $t=1$ to $(n-1)$ is previously written in a ROM and it is detected that the value is coincident with the value of $(D^2/E)$ calculated from the output of the ROM and a received word, t can be obtained. If the above coincidence is not detected, it means that errors are occurring in more than three words.

Thus, if the following expressions are assumed, $$X = 1 + \alpha^t$$

$$Y = 1 + \alpha^{-t} = \frac{D^2}{E} + S$$

The following expressions are obtained:

$$\alpha^i = \frac{D}{X}$$

$$\alpha^j = \frac{D}{Y}$$

From the above expressions, the error locations i and j are obtained. Then, the error patterns ei and ej are expressed as follows:

$$ei = \frac{(\alpha^j S_0 + S_1)}{D} = \frac{S_0}{Y} + \frac{S_1}{D}$$

$$ej = \frac{(\alpha^i S_0 + S_1)}{D} = \frac{S_0}{X} + \frac{S_1}{D}$$

Thus, the errors can be corrected.

The above modified correction algorithm can much shorten the time required to calculate the error location upon correcting two word errors as compared with that of the fundamental algorithm.

Further, if the number k of the check words is increased, the error correcting ability can be improved accordingly. For example, if k is selected as 6, three word errors can be corrected, and six word errors can be corrected when the error location is known.

Now, an embodiment of the present invention will be described with reference to the attached drawings. Therein the invention is applied, as an example, to the recording and reproducing of an audio PCM signal.

Figure 1A:
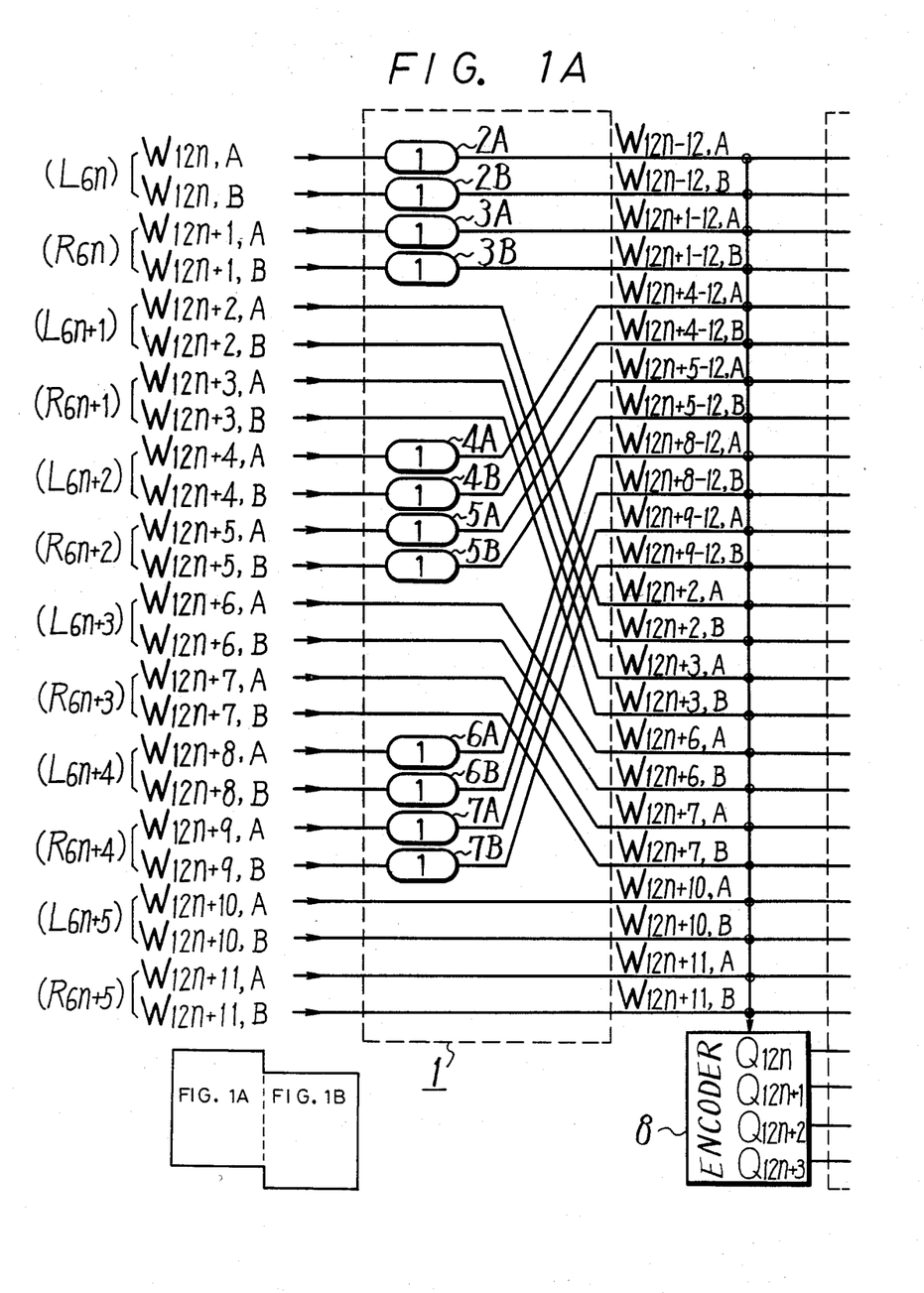
Figure 1B:
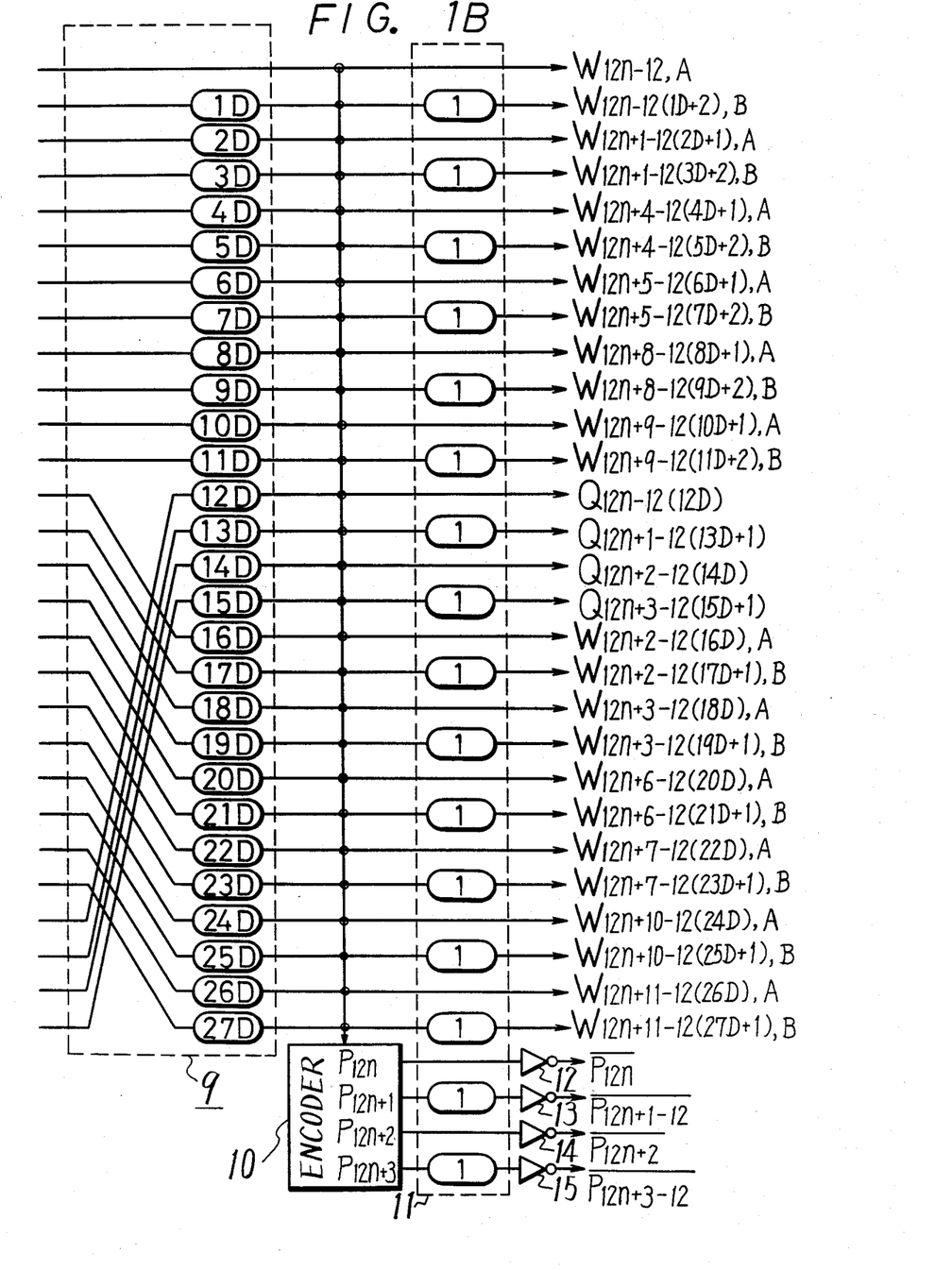

FIG. 1 shows, as a whole, an error correcting encoder provided in the recording system to which is supplied an audio PCM signal as an input signal. To provide this audio PCM signal, left and right stereo signals are respectively sampled at a sampling frequency $f_s$ (for example, 44.1 KHz) and each sampled value is converted into one digital word (which, for example, is encoded as a complement-of-two and has a length of 16 bits). Accordingly, for the left channel of the audio signal there are obtained PCM data words $L_0$, $L_1$, $L_2$ ... and for the right channel there are obtained PCM data words $R_0$, $R_1$, $R_2$ .... The PCM data words of the left and right channels are each separated into six channels, and hence a total of twelve channels of PCM data sequences are input to the error correcting encoder. At any given point in time, twelve words, such as $L_{6n}$, $R_{6n}$, $L_{6n+1}$, $R_{6n+1}$, $L_{6n+2}$, $R_{6n+2}$, $L_{6n+3}$, $R_{6n+3}$, $L_{6n+4}$, $R_{6n+4}$, $L_{6n+5}$ and $R_{6n+5}$, are input into the encoder. In the illustrated example, each word is divided into an upper eight bits and lower eight bits, and hence the twelve channels are processed as twenty-four channels. For the sake of simplicity, each one word of the PCM data is expressed as Wi, its upper eight bits are expressed as Wi, A and its lower eight bits are expressed as Wi, B. For example, the word $L_{6n}$ is divided into two words, $W_{12n}$, A and $W_{12n}$, B.

The PCM data sequences of twenty-four channels are first applied to an even-and-odd interleaver 1. If n is an integer 0, 1, 2 ..., the words $L_{6n}$ (i.e., $W_{12n}$,A and $W_{12n}$,B), $R_{6n}$ (i.e., $W_{12n+1}$,A and $W_{12n+1}$,B), $L_{6n+2}$ (i.e., $W_{12n+4}$,A and $W_{12n+4}$,B), $R_{6n+2}$ (i.e., $W_{12n+5}$,A and $W_{12n+5}$,B), $L_{6n+4}$ (i.e., $W_{12n+8}$,A and $W_{12n+8}$,B), and $R_{6n+4}$ (i.e., $W_{12n+9}$,A and $W_{12n+9}$,B) are respectively evenorder words and the remaining words are respectively oddorder words. The PCM data sequences consisting of evenorder words are respectively delayed through one word delay circuits or lines 2A, 2B, 3A, 3B, 4A, 4B, 5A, 5B, 6A, 6B, 7A and 7B of the even-and-odd interleaver 1. It is of course possible to delay words larger than one word, for example, eight words. Further, in the even-and-odd interleaver 1, the twelve data sequences consisting of even-order words are converted or shifted so as to occupy the first to twelfth transmission channels and twelve data sequences consisting of odd-order words are converted so as to occupy the thirteenth to twenty-fourth transmission channels, respectively.

The even-and-odd interleaver 1 serves to prevent more than two continuous words of the respective left and right stereo signals from developing errors, in which case the errors become substantially impossible to correct.

To explain the benefit of this feature, three continuous words $L_{i-1}$, $L_i$, and $L_{i+1}$ will be considered as an example. When the word $L_i$ is erroneous and it is not correctable, it is most desirable that both the surrounding words $L_{i-1}$ and $L_{i+1}$ be correct. The reason for this is that in order for an uncorrectable erroneous word $L_i$ to be compensated, $L_i$ is interpolated between the preceding correct word $L_{i-1}$ and the following correct word $L_{i+1}$, usually by taking the mean value of $L_{i-1}$ and $L_{i+1}$. The delay lines 2A, 2B, ... 7A and 7B of the even-and-odd interleaver 1 are provided so that adjacent words will occur in different error correcting blocks. Further, the reason for gathering together groups of transmission channels for the even-order words and the odd-order words is that when the data sequences are interleaved, the distance between the recording positions of the adjacent even and odd order words should be as great as possible.

At the output of the even-and-odd interleaver 1, the words of the twenty-four channels appear in a first arrangement state. From the interleaver 1 respective PCM data words are applied word by word to an encoder 8 which then generates first check words $Q_{12n}$, $Q_{12n+1}$, $Q_{12n+2}$, and $Q_{12n+3}$, as shown by p, q, r, s in the expression given above.

An error correcting block including the first check words then occurs as follows: ($W_{12n-12}$,A; $W_{12n-12}$,B; $W_{12n+1-12}$,A; $W_{12n+1-12}$,B; $W_{12n+4-12}$,A; $W_{12n+4-12}$,B; $W_{12n+5-12}$,A; $W_{12n+5-12}$,B; $W_{12n+8-12}$,A; $W_{12n+8-12}$,B; $W_{12n+9-12}$,A; $W_{12n+9-12}$,B; $W_{12n+2}$,A; $W_{12n+2}$,B; $W_{12n+3}$,A; $W_{12n+3}$,B; $W_{12n+6}$,A; $W_{12n+6}$,B; $W_{12n+7}$,A; $W_{12n+7}$,B; $W_{12n+10}$,A; $W_{12n+10}$,B; $W_{12n+11}$,A; $W_{12n+11}$,B; $Q_{12n}$; $Q_{12n+1}$; $Q_{12n+2}$; $Q_{12n+3}$).

The first encoder 8 carries out its function by calculating the first check words $Q_{12n}$ to $Q_{12n+3}$ according to the number of words of one block (n=28); the bit length m of each word (m=8); and the number of the check words (k=4).

The twenty-four PCM data word sequences and the four check word series are then applied to an interleaver 9. In this interleaver 9, the relative positions of the channels are changed such that the check word series are located between the PCM data sequences consisting of the even order words and the PCM data sequences consisting of the odd order words, and thereafter a delay process is performed for these interleaving sequences. This delay process is carried out on twenty-seven transmission channels, beginning with the second transmission channel, by delay lines with delay amounts of 1D, 2D, 3D, 4D, . . . 26D, and 27D, respectively (where D is a unit delay amount).

At the output of the interleaver 9, twenty-eight sequences of data words appear in a second arrangement state. The data words are taken word by word from the respective data sequences and these words are fed to an encoder 10 which then produces second check words $P_{12n}$, $P_{12n+1}$, $P_{12n+2}$ and $P_{12n+3}$ in the same manner as the check words $Q_{12n}$ to $Q_{12n+3}$.

Just as the above encoder 8 provides the above first check words according to the parameters n=28, m=8, and k=4, the similar encoder 10 provides the second check words according to the parameters n=32, m=8, and k=4.

An error correcting block including the second check words and consisting of thirty-two words is formed as follows:

($W_{12n-12}$,A; $W_{12n-12(D+1)}$, B; $W_{12n+1-12(2D+1)}$,A;
$W_{12n+1-12(3D+1)}$,B; $W_{12n+4-12(4D+1)}$,A;
$W_{12n+4-12(5D+1)}$,B; $W_{12n+5-12(6D+1)}$,A;
$W_{12n+5-12(7D+1)}$,B; . . . ; $Q_{12n-12(12D)}$; $Q_{12n+1-12(13D)}$;
$Q_{12n+2-12(14D)}$; $Q_{12n+3-12(15D)}$;
$W_{12n+10-12(24D)}$,A; $W_{12n+10-12(25D)}$,B;
$W_{12n+11-12(25D)}$,A; $W_{12n+11-12(27D)}$,B; $P_{12n}$; $P_{12n+1}$;
$P_{12n+2}$; $P_{12n+3}$).

An interleaver 11 is provided thereafter, and includes delay lines of one word delay amount for the even order transmission channels of the thirty-two data sequences including the first and second check words, and inverters 12, 13, 14 and 15 are provided for inverting the second check word series. The interleaver 11 serves to prevent errors occurring over the boundary between the blocks from affecting so many words that it is impossible to correct them. The inverters 12, 13, 14 and 15 serve to prevent misoperation when all the data in one block are made "0" by the occurrence of drop out during transmission. That is to say, if drop out does occur, the inverted check word series will be discriminated correctly in the reproducing system. For the same purpose, inverters may be provided for the first check word series.

Figure 2:
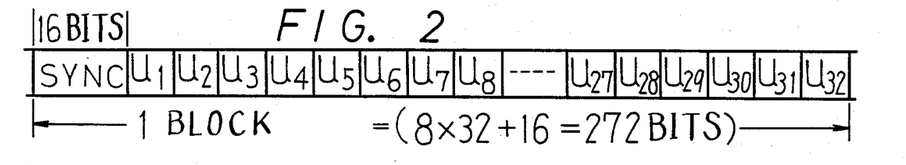
FIG. 2 shows an arrangement of a block of encoded data at transmission.

The finally-derived twenty-four PCM data sequences and eight check word series are serialized as thirty-two-word blocks and a synchronizing signal of sixteen bits is added to the resulting serial data at the head thereof to form one transmission block as shown in FIG. 2. The block thus made is transmitted on a transmission medium or carrier. In FIG. 2, the word provided from the ith transmission channel is depicted as $U_i$.

Practical examples of the transmission medium, or carrier, for the transmitted signal can include magnetic tape for use in magnetic recording and reproducing apparatus, a disc for use in a rotary disc apparatus, or other similar media.

Figure 3A:
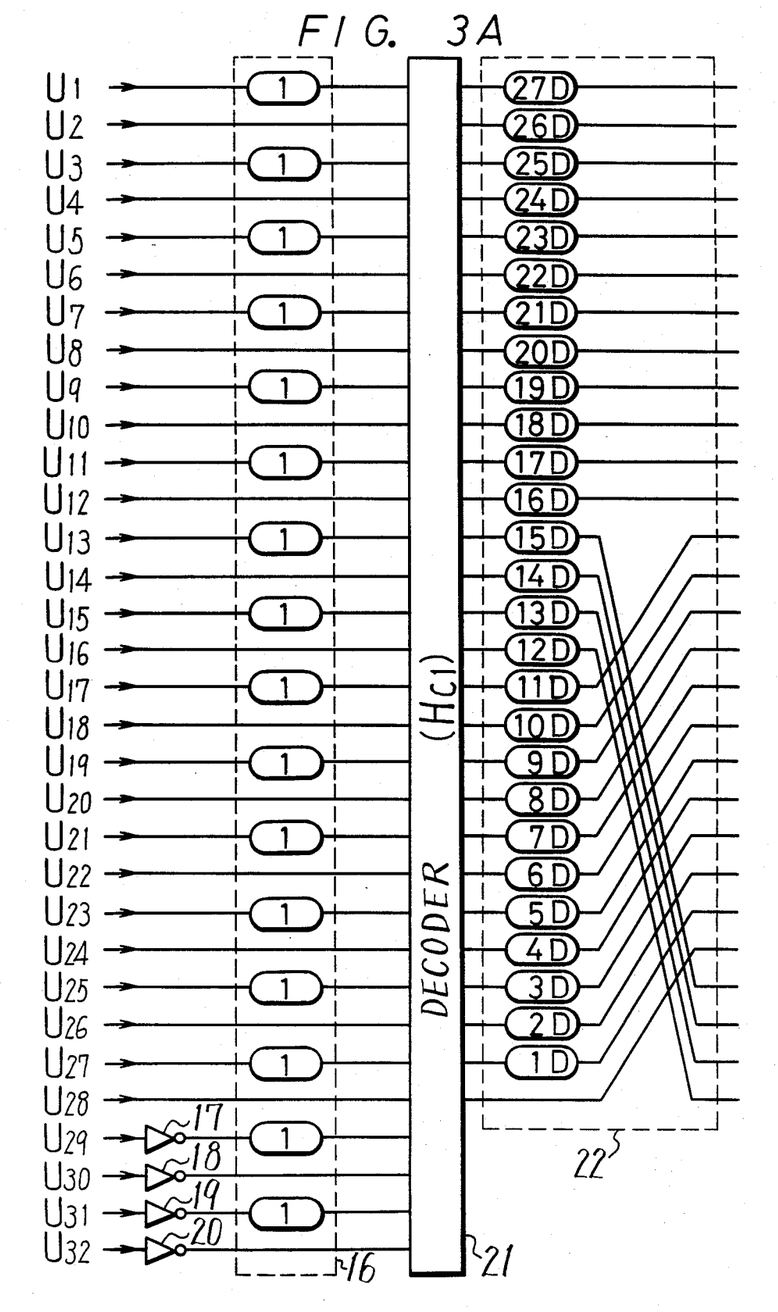
Figure 3B:
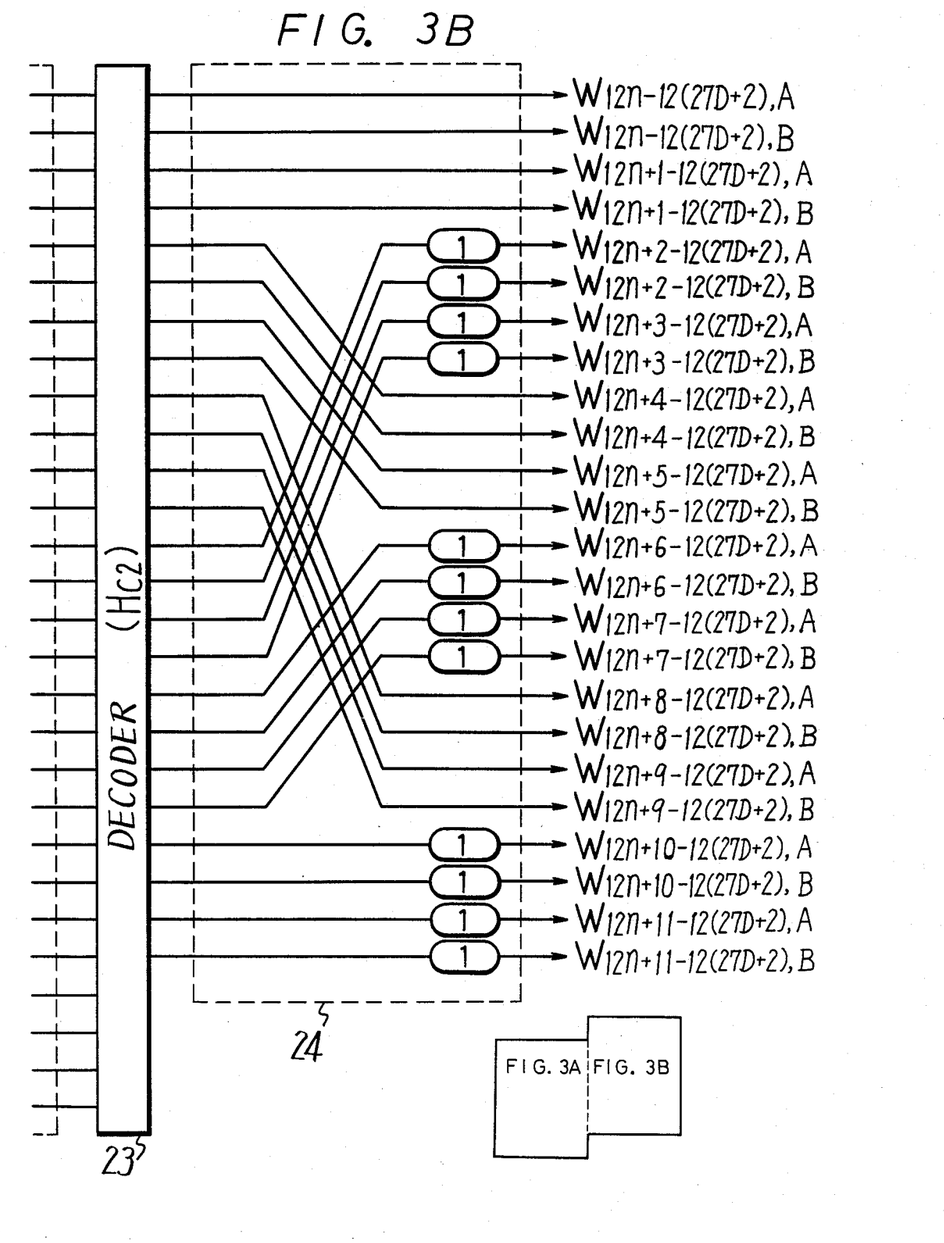

The reproduced data at every thirty-two words of each block of the transmitted signal are applied to the input of an error correcting decoder shown in FIG. 3. The transmitted data as received at the error correcting decoder may contain one or more errors since the input data are reproduced data. If there is no error, the thirty-two words fed to the input of the decoder coincide with the thirty-two words appearing at the output of the error correcting encoder. At the error correcting decoder a de-interleave process complementary to the corresponding interleave process at the encoder is performed to return the data to its original order. If there is an error, the error correcting process is carried out after the data are restored to the original order.

Figure 5:
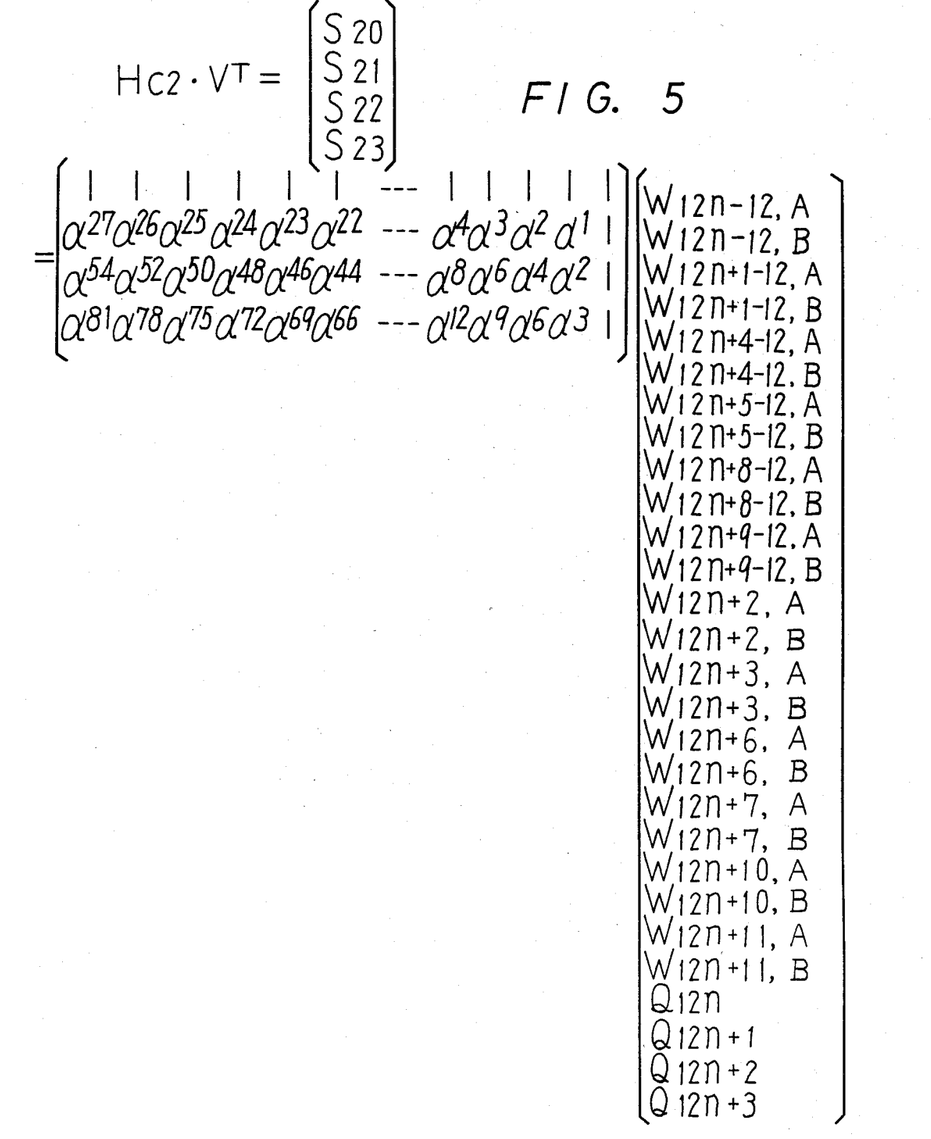

Initially, as shown in FIG. 3, a de-interleaver 16 is provided in which delay lines, each having a delay amount of one word, are provided for the odd order transmission channels, and inverters 17, 18, 19 and 20 are provided for inverting the received second check word series. The outputs from the de-interleaver 16 and the inverters 17 to 20 are coupled to a first decoder 21. In this first decoder 21, syndromes $S_{10}$, $S_{11}$, $S_{12}$ and $S_{13}$ are generated according to a matrix, such as the Reed-Solomon parity detection matrix $H_{C1}$ (FIG. 4) by the thirty-two input words $V^T$ as shown in FIG. 4, and the abovementioned error correction is performed based upon the syndromes $S_{10}$ to $S_{13}$. In FIG. 4, $\alpha$ is an element of $GF(2^8)$ and a root of $F(x)=x^8+x^4+x^3+x^2+1$. The decoder 21 derives the corrected twenty-four PCM data sequences and four first check word series. At every individual word of the data sequences, a pointer, or error detecting code, (at least one bit) is added to indicate whether there is an error in the associated word (pointer is "1") or not (pointer is "0"). In FIG. 4 and FIG. 5 and also in the following description, the received one word Wi will be referred to merely as Wi.

The output data sequences from the decoder 21 are applied to a de-interleaver 22 which serves to compensate for the delay process performed by the interleaver 9 in the error correcting encoder, and has corresponding delay lines with respective different delay amounts of 27D, 26D, 25D, . . . 2D, and 1D provided for the first to twenty-seventh transmission channels. The output from the de-interleaver 21 is applied to a second decoder 23 in which syndromes $S_{20}$, $S_{21}$, $S_{22}$ and $S_{23}$ are generated according to a matrix, such as the Reed-Solomon parity detection matrix $H_{c2}$ (FIG. 5). The twenty-eight words $V_T$ as shown in FIG. 5 are applied thereto and the abovementioned error correction is carried out based upon the syndromes $S_{20}$ to $S_{23}$.

The decoder 23 clears the pointer relating to each word whose error is corrected, but does not clear the pointer relating to any word whose error cannot be corrected.

The data sequences appearing at the output of the decoder 23 are applied to an even-and-odd de-interleaver 24, in which the PCM data sequences consisting of the even-order words and the PCM sequences consisting of the odd-order words are rearranged so that they are positioned at alternative transmission channels, and delay lines of one word delay amount are provided for the PCM data sequences consisting of the odd-order words. This compensates for the corresponding operation performed in the encoder prior to transmission. At the output of the even-and-odd de-interleaver 24, there are provided the PCM data sequences which have the original arrangement state and predetermined order restored entirely to that of the digital signal before it was acted upon by the error correcting encoder.

Although not shown in FIG. 3, a compensating circuit is preferably provided at the next stage following the even-and-odd de-interleaver 24 to compensate for uncorrectable errors. For example, a mean-value interpolation can be used whenever errors are not corrected by the decoders 21 and 23, so that any remaining errors are masked and made inconspicuous.

In the example of the invention shown in FIG. 3, one word error is corrected by the first decoder 21. When it is detected that more than two word errors exist in one error correcting block, the pointer of at least one bit is added to all of twenty-eight words of the error correcting block, i.e., to all words of the thirty-two word block except the check words, to indicate the existence of errors as set forth above. This pointer is "1" when there is an error but "0" when there is no error. In the case where one word consists of eight bits, the pointer is added as one bit higher than MSB so that one word is made to consist of nine bits. Then, the words are processed by the de-interleaver 22 and thereafter fed to the second decoder 23.

In this decoder 23, the error is corrected by using the number of error words in the first error correcting block indicated by the pointer or error location.

Figure 6:
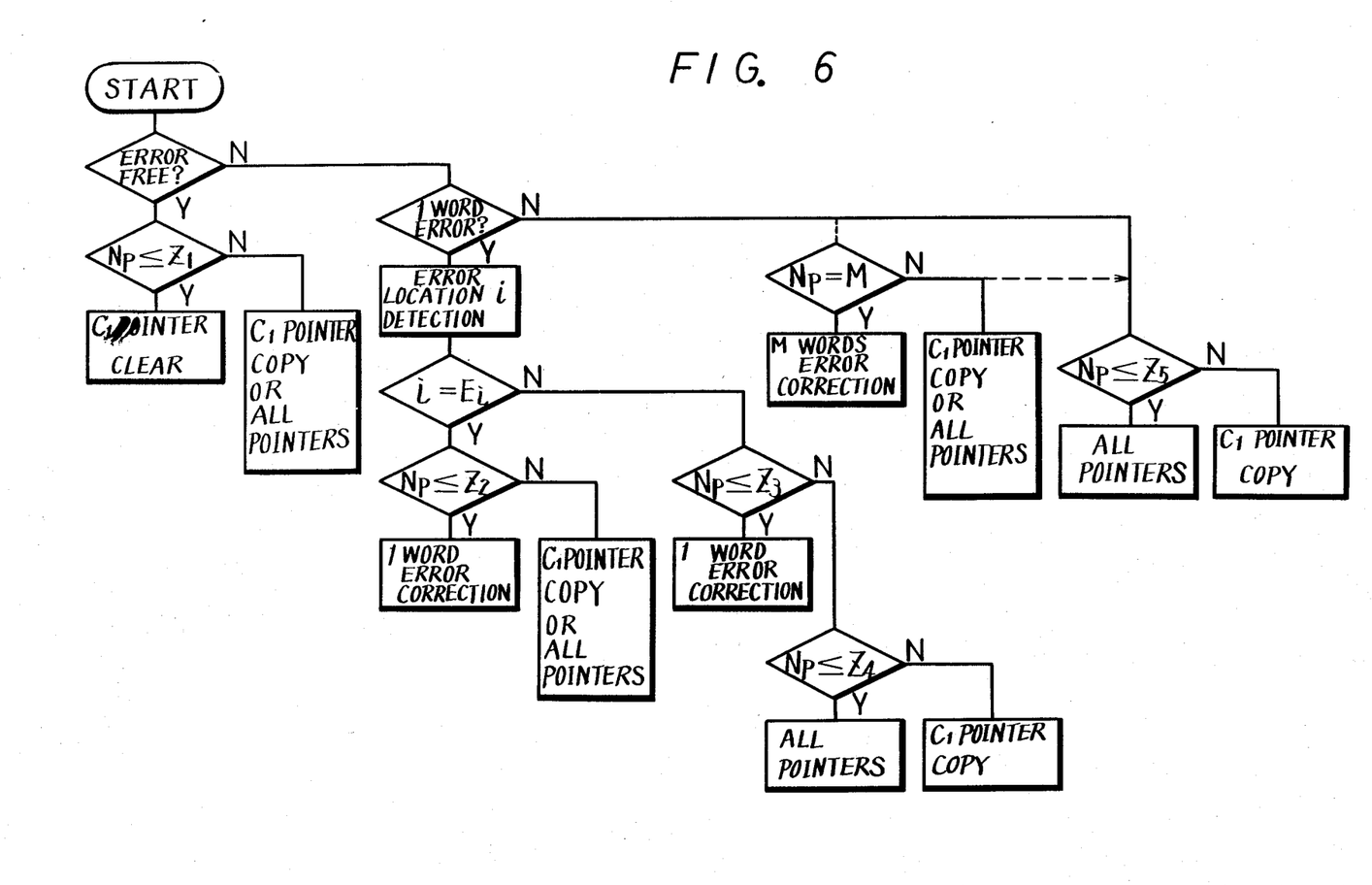

FIG. 6 is a chart showing an example of the error correction operation carried out by the second decoder 23. In FIG. 6 and the following description thereof, the number of erroneous words by the pointers is expressed by $N_p$ and the error location by the pointers is expressed by $E_i$. Further, in FIG. 6, Y represents "yes" and N represents "no".

(1) The existence or not of an error is determined by the syndromes $S_{20}$ to $S_{23}$. When $S_{20}=S_{21}=S_{22}=0$, it is decided that there is no error. At this time, whether or not $N_p \leq z_1$ is satisifed as examined. If $N_p \leq z_1$, it is judged that there is no error, and then the pointers in the error correcting block are cleared ("0"). If, on the contrary, $N_p > z_1$, the error detection by the syndromes is judged erroneous and the pointers are maintained unchanged or, alternatively, pointers for all the words in the block are made "1". In the latter case, the value of $z_1$ is selected relatively large, for example, 14.

(2) In the case that there is an error, it is investigated by the calculation of the syndromes whether or not the error is one word error. In the case of one word error, the error location i is obtained. It is detected whether or not the error location i obtained by the calculation of the syndrome coincides with that indicated by the pointers. When plural error locations are indicated by the pointers, it is investigated which error location i coincides with which of the plural error locations indicated by the pointers. If $i = E_i$, it is then examined whether $N_p \leq z_2$ or not, where $z_2$ is, for example, 10. If $N_p \leq z_2$, the error is judged as one word error and then one word error is corrected. If $N_p > z_2$, it is possible that the error is incorrectly adjudged as one word with error. Therefore, the pointer remains unchanged, or, alternatively, all the words are deemed erroneous and the respective pointers thereof are made "1".

In the case of $i \neq E_i$, it is investigated whether $N_p \leq z_3$ or not, where $z_3$ is a rather small value, for example, 3. When $N_p \leq z_3$ is established, one word error at the error location i is corrected by the calculation of the syndrome.

In the case of $N_p > z_3$, it is further checked whether $N_p \leq z_4$ or not. When $z_3 < N_p \leq z_4$, it means that although the judgement of one word error by the syndrome is erroneous, $N_p$ is too small. Therefore, in this case the pointers for all words of the block are made "1". On the contrary, in the case of $N_p > z_4$ each pointer remains unchanged. In this case, $z_4$ is, for example, 5.

(3) In the case where there is not a single word error, it is judged whether or not $N_p \leq z_5$. When $N_p \leq z_5$, the pointer is poor or lacks reliability, so that the pointers for all the words are made "1". However, when $N_p > z_5$, the pointers remain as is.

(4) As shown in FIG. 6 by the broke line, it is possible to correct errors in up to M words by using the error location indicated by the pointer. Up to four word errors may be corrected, but a pointer erasure method cannot avoid an erroneous correction. Therefore, in consideration of the time and complexity required for a correcting operation, M is selected as about 2. Then, two word errors relating to the error locations i and j indicated by the pointers are corrected. In the case of $N_p \neq M$, the pointers remain unchanged or the pointers for all the words are changed to those indicating errors.

In the above description, the practical values of the comparison values $z_1$ to $z_5$ relative to the number $N_p$ of the pointers indicating the errors in one block are merely examples. In the above example, the error correcting code has a possible drawback in that if a block contains more than five word errors, it can be incorrectly judged to be error free, and also that if a block contains more than four word errors, it can be incorrectly judged to contain only one word error. Therefore, the comparison values may be selected suitably in consideration of the probability that the above error-overlooking or erroneous correction occurs.

In the above example of the invention, although up to one word error is corrected in the first decoder, the encoder can be modified so that up to two word errors are corrected, and pointers may be added which indicate the existence of errors in all the words in the error correcting block in which the error-corrected word is contained. Similarly, up to two word errors can be corrected in the second decoder.

Figure 7A:
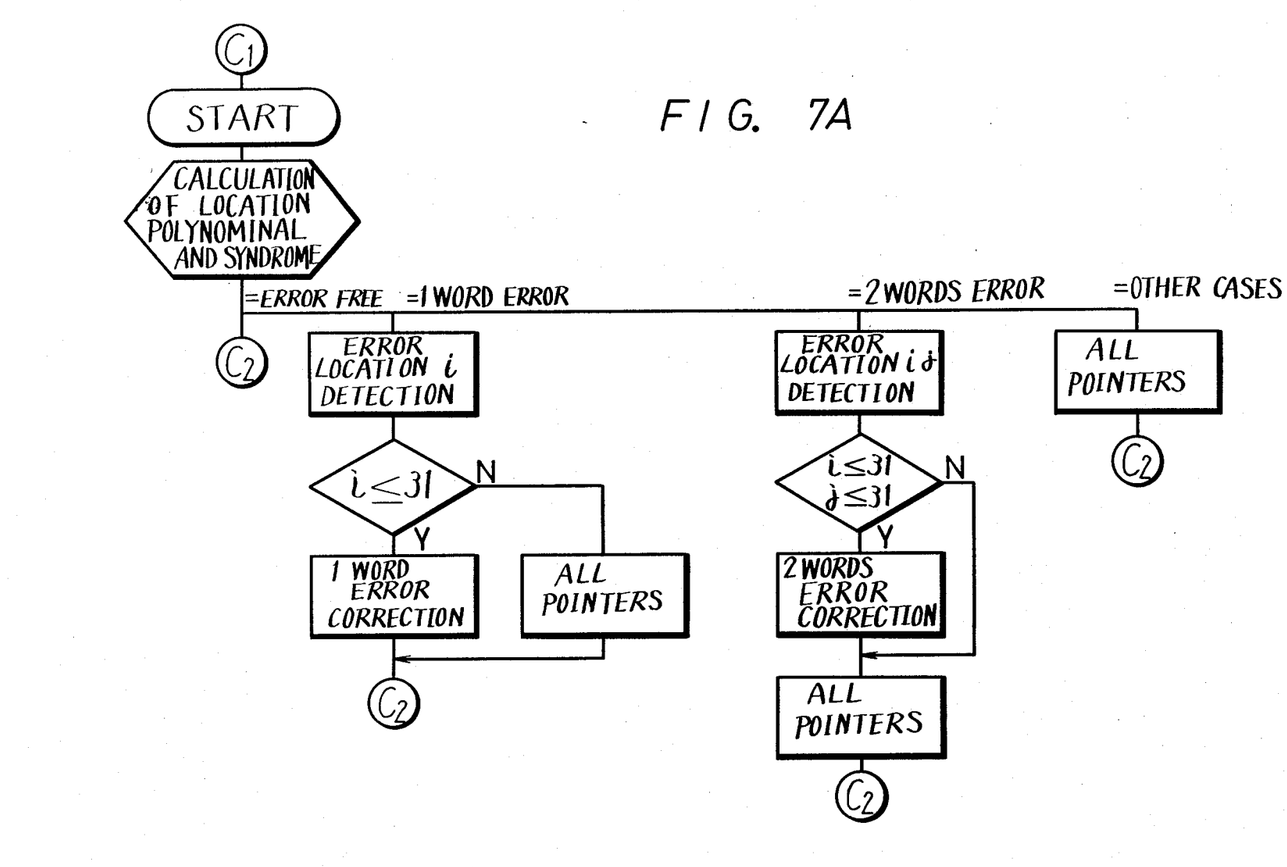
Figure 7B:
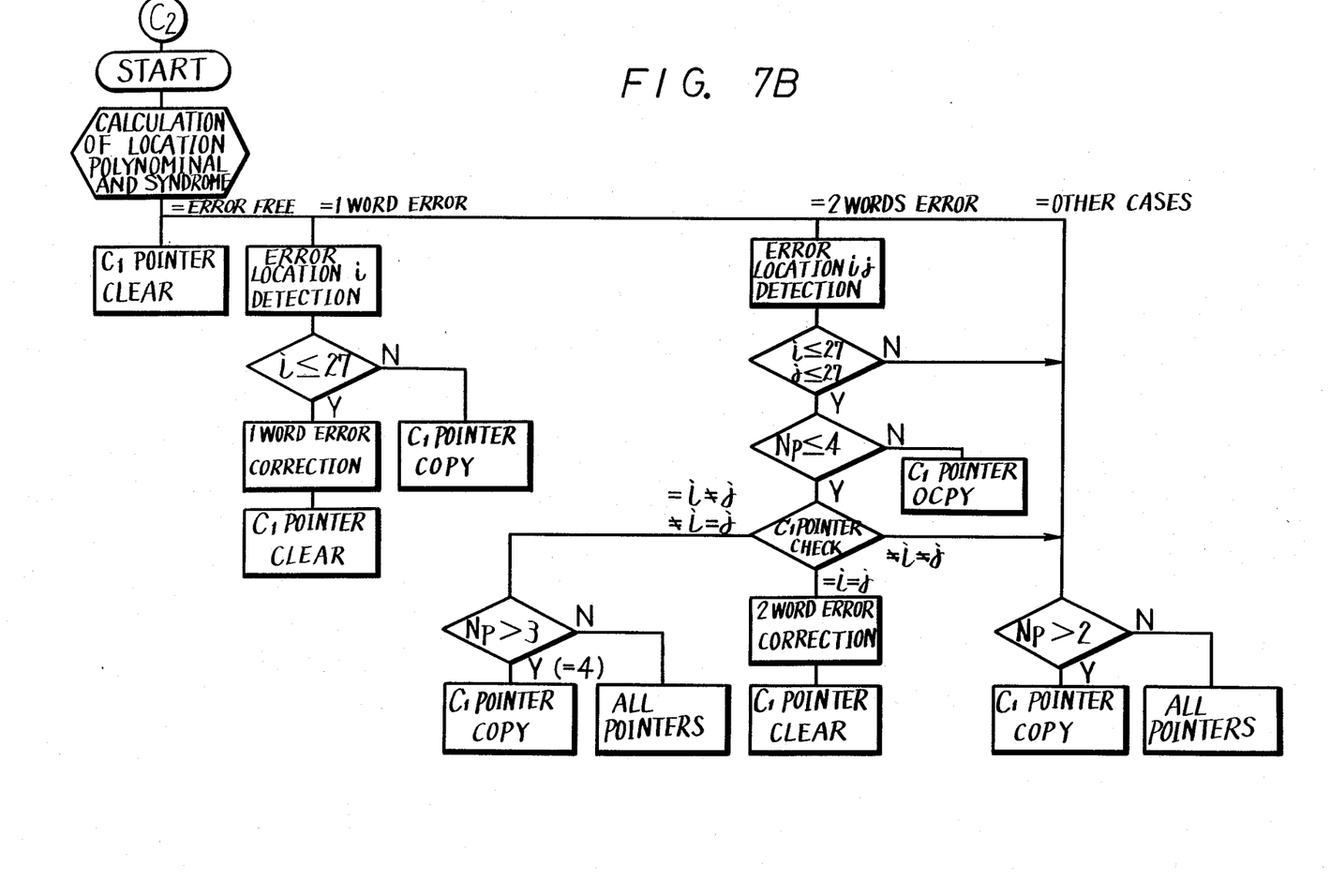

Now, a more practical example in the above error correcting method will be described with reference to FIGS. 7A and 7B. A block of data is operated upon (step $C_1$) in the first decoder 21 where the state of an error is judged by using the above error location polynominal and the error syndrome.

(1) Where the block is adjudged to be error-free, no pointer is added and the data are unchanged, subject to the second decoding $C_2$.

(2) In the case of one word error, the error location is obtained. If the error location i is less than or equal to 31, the one word is corrected. However, if the error location i is more than 31, then more than four word errors are erroneously judged as one word error. Consequently, pointers are added to all words and then the data are decoded at the next stage $C_2$.

(3) In the case of two word errors, the error locations are calculated. When the error locations i,j are each determined to be less than or equal to 31, the two words are corrected and also pointers are added to all words. When the error locations or j are more than 31, more than three word errors are erroneously judged as two word errors. Therefore, all the words are given error-indicating pointers and thereafter subjected to the next stage of decoding $C_2$.

(4) In the case of more than three word errors, no correcting operation is carried out, but error-indicating pointers are added to all words and then the data are subjected to the next stage of decoding $C_2$.

At the second decoder 23, similar to the first decoder 21, the nature of any error is first judged by the error location polynominal and the error syndromes. This is explained with reference to FIG. 7B.

(1) In the case of no detected error, if the pointer added by the first decoder exists (i.e., is "1"), it is cleared (i.e., is made "0").

(2) In the case of one word error, the error location is calculated. If the error location is less than or equal to 27, the erroneous word is corrected and the pointer added by the first decoder 21 is cleared. However, when the error location is more than 27, no correcting operation is performed and the pointer added previously remains as is; otherwise, the pointers are added to all words.

(3) In the case of two word errors, if the number of the pointer is more than 3" the respective error locations i and j are calculated. When the error locations i or j is more than 27, more than three word errors are erroneously judged as two word errors. At this time, however, the number of the pointers added in the first decoder 21 is checked. If the number of the pointers exceeds 2, the pointers are held unchanged. If the number of the pointers is less than or equal to 2 even though two word errors are detected, pointers are added to all words since the data of the whole block are unreliable. Even when the error locations i,j are less than 27, if the number of the pointers added in the first decoder 21 is more than 4, the pointers added are held unchanged. Also, when the number of the pointers is less than or equal to 4, the error location i or j obtained at this stage is compared with the pointer added in the first decoder 21.

(a) When two words are not coincident, no error correcting operation is carried out and the number of pointers is checked. When the number exceeds 2, the pointers added are held unchanged. However, when the number of pointers is less than or equal to 2, pointers are added to all words.

(b) When only one of the words is coincident, the number of pointers is also checked. When the number exceeds 3, for example, is 4, the pointers added are left unchanged. However, if the number is less than or equal to 3, pointers are added to all words.

(c) When two words are both coincident, the two words are corrected, and thereafter the pointers are cleared.

(4) In the case where an error is judged as more than three words, the number of pointers is checked. When the number exceeds 2, the pointers added are unchanged, while when the number is less than 2, pointers are added to all words.

Later during the decoding process, as mentioned above, the words added with the pointers are compensated as being uncorrectable, for example, by interleaving.

In the error correcting decoder shown in FIG. 3, error correction using the first check words $Q_{12n}$, $Q_{12n+1}$, $Q_{12n+2}$ and $Q_{12n+3}$ and error correction using the second check words $P_{12n}$, $P_{12n+1}$, $P_{12n+2}$ and $P_{12n+3}$ are each carried out one time. However, if the above error corrections are respectively carried out two times or more (in practice, about two times), the error correcting ability can be increased considerably, since the corrected result is each time less in error. As set forth above, in the case where an additional decoder is provided further in the latter stage, it is necessary that the check word is corrected in a corresponding decoder additional to the decoders 21 and 23.

In the above example, in the delay process in the interleaver 9, the delay amount differs from one channel to the next by a constant amount of variation D, but it is also possible to employ an irregular variation in delay amount rather than the above constant variation. Further, the second check words Pi are such error correcting codes which are formed not only from the PCM data words but also the first check words Qi. Similarly, it is possible that the first check words Qi are formed from words including the second check words Pi. To this end, a feedback technique can be employed so that the second check words Pi are fed back to the encoder which produces the first check words.

As will be understood from the above description of an example of the present invention, any burst error is dispersed by the cross-interleave operation so that both random errors and burst errors can be effectively corrected by the technique of this invention.

Further, when an error is detected at the first stage of decoding, a pointer representing the existence of error is added to the word. In the case where the existence or not of error is detected upon the decoding of the second decoder, the possibility that the error detection is erroneous at the second decoding is avoided by not only the calculated syndrome but also by judging the number of pointers in each one block provided from the first decoder. In this manner, the chance that a detected error is overlooked is reduced, thereby minimizing the prospect that an allophone is generated upon transmitting, for example, audio PCM signal.

It will be apparent that many modifications and variations could be effected by one skilled in the art without departing from the spirit or scope of the present invention, which is to be determined by the appended claims.

What is claimed is:

1. A method of decoding transmitted digital information signals to correct errors occurring therein as a result of transmission, wherein said information signals are received as blocks of interleaved digital data word signals and are applied to a first decoder as first error-correcting blocks comprised of a plurality of information word signals, a series of first check word signals associated with said plurality of information word signals, and a series of second check word signals associated with said plurality of information word signals, said information word signals and said first check word signals being interleaved, comprising the steps of:

decoding the received digital data word signals in said first decoder and correcting the decoded digital information word signals and said first check word signals by generating error syndromes using said second check word signals, the corrected and decoded digital information word signals forming a block of interleaved word signals;

tagging a pointer code signal to each of said information word signals of the block of interleaved word signals to represent whether an uncorrected error remains in such word signals;

delaying the tagged interleaved word signals of each such block of tagged interleaved word signals in a deinterleaving stage by respective different amounts so as to deinterleave such tagged interleaved word signals into a different arranging order, thereby providing a second error-correcting block;

decoding the digital information word signals of each such second error-correcting block in a second decoder by generating error syndromes using said first check word signals, then comparing, for each said second error-correcting block, the number of erroneous word signals as indicated by said pointer code signals with a predetermined value and, if such number is less than said value, correcting said at least one erroneous word signal by said syndromes and said first check word signals, and then clearing the pointer code signals associated with the corrected erroneous word signals, but, if such number exceeds such value, leaving such pointer code signals uncleared and said at leat one erroneous word uncorrected.

2. A method of decoding transmitted digital information signals according to claim 1, wherein even if all word signals in said second error-correcting block are determined to be error-free, any pointer code signals associated therewith are left unerased if said number exceeds said predetermined value.

3. A method of decoding transmitted digital information signals according to claim 1, wherein if all word signals in said second error-correcting block are determined to be error-free, but said number exceeds said predetermined value, all word signals in such block are given a pointer code signal to indicate uncorrected error.

4. A method of decoding transmitted digital information signals according to claim 1, wherein if at least a predetermined number of word signals in any one second error-correcting block are determined, by using the error syndromes in said second decoder, to contain errors and the number of erroneous words in such block indicated by said pointer code signals is smaller than a predetermined amount, all word signals in such block are given a pointer code signal to indicate uncorrected error.

5. A method of decoding transmitted digital information signals according to claim 1, wherein, if a plurality of word signals of said second error-correcting block are determined to be erroneous, and the location of each such erroneous word signal is determined by use of said pointer code signals, said erroneous word signals are corrected, and if said number of erroneous word signals as indicated by said pointer code signals are different from said plurality, the pointer code signals associated with the word signals in said second error-correcting block remain unchanged, but if said number is equal to said plurality, said pointer code signals are cleared.

6. A method of decoding transmitted digital information signals according to claim 5, wherein said plurality is limited to not more than two erroneous word signals.

7. A method of decoding transmitted digital information signals according to claim 1, wherein said decoding carried out in said first decoder includes determining the word location of any erroneous word signal in said first error-correcting block, comparing said word location with a predetermined number, and if the detected word signal location is greater than said predetermined number, giving all word signals in such block a pointer code signal to indicate uncorrected error.

8. A method of decoding transmitted digital information signals according to claim 7, wherein each word signal in said block has a word position order and said predetermined number equals the word position order of the highest-order word signal in said first error-correcting block.

9. A method of decoding transmitted digital information signals according to claim 7, wherein said decoding carried out in said second decoder includes determining the word location of any erroneous word signal in said second error-correcting block, comparing said word location with another predetermined number, and if the detected word location is greater than said other predetermined number, giving all word signals in said second error-correcting block a pointer code signal to indicate uncorrected error.

10. A method of decoding transmitted digital information signals according to claim 7, wherein each word signal in said second error-correcting block has a word position order and said other predetermined number equals the word position order of the highest-order word signal in said second error-correcting block.

11. A method of decoding transmitted digital information signals according to claim 1, wherein said step of decoding in the second decoder further includes calculating the word location of any erroneous word signals within such second error-correcting block; comparing the calculated word location with an erroneous word location indicated by the associated pointer code signal, and correcting at least one such word signal at such erroneous word location.

12. A method of decoding transmitted digital information signals according to claim 1; and further comprising, after said step of decoding in said second decoder, compensating any uncorrected erroneous word signals as determined by said pointer code signals.

* * * * *